(12) United States Patent
Svinos et al.

(10) Patent No.: US 8,037,012 B1
(45) Date of Patent: Oct. 11, 2011

(54) SOFTWARE METHOD TO SELECT, EVALUATE, AND RECOMMEND OPTIMAL ROD PUMPING SYSTEM DESIGN USED IN THE EXTRACTION OF FLUIDS FROM A DOWNHOLE WELL

(75) Inventors: John G. Svinos, Fullerton, CA (US); Marty Connally, Carson City, NV (US)

(73) Assignee: Delaware Capital Formation, Inc., Wilmington, DE (US)

( * ) Notice: Subject to any disclaimer, the term of this patent is extended or adjusted under 35 U.S.C. 154(b) by 555 days.

(21) Appl. No.: 12/234,068

(22) Filed: Sep. 19, 2008

(51) Int. Cl.
*G06F 15/00* (2006.01)
*G06F 15/18* (2006.01)

(52) U.S. Cl. .................. 706/62; 166/241.3; 166/176

(58) Field of Classification Search ............... 706/50
See application file for complete search history.

(56) References Cited

U.S. PATENT DOCUMENTS

| | | | | |
|---|---|---|---|---|
| 4,182,537 | A * | 1/1980 | Oster | 166/241.3 |
| RE31,016 | E * | 8/1982 | Oster | 166/241.3 |
| 5,406,482 | A * | 4/1995 | McCoy et al. | 702/6 |
| 5,464,058 | A * | 11/1995 | McCoy et al. | 166/250.01 |
| 5,589,633 | A * | 12/1996 | McCoy et al. | 417/63 |
| 7,346,455 | B2 * | 3/2008 | Ward et al. | 702/6 |

OTHER PUBLICATIONS

Opinion mining: A study on semantic orientation analysis for online document, Lei Yu; Jia Ma; Seiji Tsuchiya; Fuji Ren; Intelligent Control and Automation, 2008. WCICA 2008. 7th World Congress on Digital Object Identifier: 10.1109/WCICA.2008.4594529 Publication Year: 2008, pp. 4548-4552.*
Using statistical methods to improve knowledge-based news categorization, Jacobs, P.S.; IEEE Expert vol. 8, Issue: 2 Digital Object Identifier: 10.1109/64.207425 Publication Year: 1993, p. 13-23.*
Command Sail: a prototype knowledge base system for a commander's associate, Pedelty, M.J.; Southeastcon '89. Proceedings. Energy and Information Technologies in the Southeast., IEEE Digital Object Identifier: 10.1109/SECON.1989.132346 Publication Year: 1989, pp. 140-145 vol. 1.*
Scalable mining for classification rules in relational databases, Min Wang; Iyer, B.; Vitter, J.S.; Database Engineering and Applications Symposium, 1998. Proceedings. IDEAS'98. International Digital Object Identifier: 10.1109/IDEAS.1998.694358 Publication Year: 1998, pp. 58-67.*

* cited by examiner

*Primary Examiner* — Michael B Holmes
(74) *Attorney, Agent, or Firm* — Head, Johnson & Kachigian, PC (57) ABSTRACT

A method to select, evaluate and recommend optimal rod pumping system design for a downhole well. The method includes the steps of selecting at least one downhole rod type as a setup preference, selecting at least one pumping unit type as a setup preference, and selecting at least one motor power meter type as a setup preference. Well information, including depth of a pump and run time, is entered as a case input. Additionally, a target production for the well is entered. Records are retrieved from a database wherein the records contain input data on each downhole rod type, each pumping unit type, and each pump motor type. Data is merged from all the case inputs, all of the setup preferences, and from the database records. Scores of gearbox loading, structure loading, system efficiency, rod loading, minimum polished rod loading and bottom minimum stress are calculated and then combined to determine a calculated percentage score for each pumping unit type for the downhole well.

9 Claims, 8 Drawing Sheets

Gearbox Loading scoring logic:
If Gearbox loading for the smallest gearbox size with
the same stroke length from the selected PU manufacturer
is less than 70%, Score = 100 and skip the rest of the gearbox scoring logic.
If 50% > Gearbox Loading, Score = 60
If 50% <= Gearbox Loading < 60%, Score = 70
If 60% <= Gearbox loading < 70%, Score = 85
If 70% <= Gearbox loading <= 95%, Score = 100
If 95% > Gearbox Loading <= 100%, Score = 75
If 100% > Gearbox Loading <= 110%, Score = 35
If 110% < Gearbox Loading <= 120%, Score = 20
If 120% < Gearbox Loading <= 135%, Score = 10
If 135% < Gearbox Loading, Score = 0

Structure Loading Scoring Logic
If loading for the smallest structure size pumping unit with
the same stroke length and gearbox size is less than 70%,
Score = 100 and skip the rest of the scoring logic.
If 50% > %Structure Loading, Score=60
If 50% <= %Structure Loading <60%, Score= 70
If 60% <= %Structure Loading <70%, Score = 90
If 70% <= %Structure Loading <= 95%, Score = 100
If 100% >= %Structure Loading > 95%, Score=95
If 100% > %Structure Loading <=110%, Score= 30
If 110% < %Structure Loading <= 120%, Score=10
If 120% < %Structure Loading, Score=0

System Efficiency Scoring Logic
If 45% <= System Efficiency, Score = 100
If 42% <= System Efficiency < 45%, Score = 95
If 40% <= System Efficiency < 42%, Score = 90
If 35% <= System Efficiency < 40%, Score = 80
If 30% <= System Efficiency < 35%, Score = 65
If 25% <= System Efficiency < 30%, Score = 50
If 25 % > System Efficiency, Score = 20

Rod Loading Scoring Logic
If loading for grade C rods < 70%, then Score = 100 and skip rest of scoring logic.
If 70% <= Rod loading <= 95%, Score = 100
If 95% < Rod loading <=100%, Score =45
If 100% < Rod loading <= 110%, Score = 25
If 110 % < Rod loading <= 120%, Score =5
If 120 % < Rod loading, Score = 0
If 60% <= Rod loading < 70%, Score = 90
If 50% <= Rod loading < 60%, Score = 75
If 40% <= Rod loading < 50%, Score = 60
If 40% < Rod loading, Score = 50

Minimum Polished Rod Load Scoring Logic
If Minimum Polished Rod Load >= 200 , Score = 100
If 100 <= Minimum Polished Rod Load < 200, Score = 90
If 50 <= Minimum Polished Rod Load < 100, Score = 80
If 20 <= Minimum Polished Rod Load < 50, Score = 50
If 0 <= Minimum Polished Rod Load < 20, Score = 30
If Minimum Polished Rod Load < 0 , Score = 0

Bottom Minimum Stress Scoring is based on both Steel and Fiberglass scores below:

Steel Bottom Minimum Stress Score (known below as SBMSS) Logic
If Pump depth < 1000 feet, Score = 100
If −300 psi < Bottom Minimum Stress < 0, Score = 50
If 3000 psi < Bottom Minimum Stress , Score = 50
If 3000 psi >= Bottom Minimum Stress >= 2000 psi, Score = 60
If 2000 psi > Bottom Minimum Stress >= 1200 psi, Score = 80
If 1200 psi > Bottom Minimum Stress >= 800 psi, Score = 90
If 800 psi > Bottom Minimum Stress >= 650 psi, Score =95
If 650 psi > Bottom Minimum Stress >= 300 psi, Score = 100
If 300 psi > Bottom Minimum Stress >= 200 psi, Score = 95
If 200 psi > Bottom Minimum Stress >= 100 psi, Score = 90
If 100 psi > Bottom Minimum Stress >= 50 psi, Score = 80
If 50 psi > Bottom Minimum Stress >= 25 psi, Score = 70
If 25 > Bottom Minimum Stress >= 0, Score = 60
If Bottom Minimum Stress < = −300 psi, Score = 30

Fiberglass Bottom Minimum Stress Score (known below as FBMSS) Logic
If Bottom Minimum Fiberglass Stress < 0, Score = 0
If 400 psi >= Bottom Minimum Fiberglass Stress > 50 psi, Score = 70
If 1000 psi >= Bottom Minimum Fiberglass Stress > 400 psi, Score = 95
If Bottom Minimum Fiberglass Stress >= 1000 psi, Score = 100

If only one rod Then, Score is FBMSS if Fiberglass, else Score is SBMSS
If more than one rod and sinker bar at Bottom Then
    If Design has no Fiberglass Then
        Score is SBMSS of rod above sinker bar
    Else If Rod above sinker bar is Fiberglass then
        Score is FBMSS of rod above sinker bar
Else If Rod above Sinker bar is Steel and Rod above steel is Fiberglass then
Score is (SBMSS of steel rod above sinker bar plus FBMSS of rod above steel) divided by 2
    Else If Last rod is Fiberglass Then
        Score is FBMSS
    Else If Last rod is steel then
        If rod above last rod is Fiberglass then
Score is (SBMSS of last rod plus FBMSS of rod above steel) divided by 2
        else if no fiberglass above last rod, Score is SBMSS

FIG. 6

SOFTWARE METHOD TO SELECT, EVALUATE, AND RECOMMEND OPTIMAL ROD PUMPING SYSTEM DESIGN USED IN THE EXTRACTION OF FLUIDS FROM A DOWNHOLE WELL

BACKGROUND OF THE INVENTION

1. Field of the Invention

The present invention is directed to a system and a method to automatically select and design a complete rod pumping system for the production of fluids from a downhole fluid well. In particular, the present invention is directed to a system and method to select the components of a rod pumping system that will produce the best overall system performance and for several types of surface pumping units simultaneously. Furthermore, the present invention uses artificial intelligence technology that allows it to learn from its own runs and can improve its itself by adding knowledge to a proprietary database to be used for future runs."

2. Prior Art

In some subterranean formations, fluid, such as oil or natural gas, is under pressure and will move to the surface once an opening is provided. In many other subterranean formations, the fluid must be extracted.

Rod pumping systems are utilized to produce oil and gas and are also used for many other applications. Downhole fluid well systems include a variety of different types of equipment which must all operate together.

It is advantageous to assemble and operate various equipment that operates together efficiently. In one type of rod pumping system, for example, a reciprocating piston pump is installed downhole beneath fluid level inside of a borehole. The pump is attached to a string of rods, sometimes termed "sucker rods", which reciprocate within a tubing and a casing.

An electric motor at surface level powered by a source of electricity typically drives cranks which are mechanically arranged to reciprocate the rod string. At or near the surface, the rod string has a section known as a polished rod which has a close fit to a stuffing box at the surface allowing the rod string to move in and out of the tubing without fluid escaping. One type of mechanical system is the well-known pump jack. Downhole in the borehole is a pump consisting of a number of valves. The motor, the assembly of rods, the surface pumping unit (pump jack), and the pump deliver fluid to the surface and must work together efficiently and without being overloaded.

Depending on the particular well and formation, the pumping equipment may operate for a few hours a day controlled by a timer or pump off controller or the pumping equipment may operate continuously 24 hours per day.

The various pieces of equipment operate within ranges and it is necessary to select equipment components that will operate within their operating ranges.

The depth of the pump in the well, the diameter of the pumping equipment, the type of motor, and the desired production all influence the optimum equipment to be employed.

In the past, it has been possible to select individual components of equipment, check the specifications to see if the individual components will operate with each other, and predict the production therefrom. This requires assembling data on equipment from various manufacturers and is time consuming.

In the more recent past, computer programs have been developed wherein individual input data on individual equipment components may be entered and thereafter predicted calculated results may be obtained on a number of items, such as predicted production rate in barrels per day and torque on the gearbox.

There remains a need to provide a system and a process that would automatically select and evaluate and recommend optimal rod pumping system design for a downhole well based on a number of preferences and on particular information on a particular well.

There remains a need to provide a system and a process that would evaluate components of a down well pumping system and compare multiple system designs against each other.

There remains a need to provide a system and a process that would evaluate chosen preferred components and attempt to suggest alternatives to improve thereon.

SUMMARY OF THE INVENTION

The present invention is directed to a method and a system in order to select, evaluate and recommend optimal rod pumping system design of a downhole fluid well.

In one non-limiting configuration, a user will be prompted to enter a number of setup preferences. The user will be presented with an option of rod preferences, for example, either all steel rods or alternatively a combination of fiberglass rods with a number of steel rods near the bottom of the well.

Thereafter, the user will be prompted to enter one or more pumping unit equipment preferences by manufacturer.

An additional setup preference is the use of average or multiple of average rod-tubing friction coefficients.

The user will also be prompted with a setup preference for an electric motor-type preference to choose between detent or non-detent electric motors.

Additionally, the user will be prompted to enter a number of case inputs. The case inputs include information on the particular well in a number of categories. The user will also be prompted to enter the pump depth and the run time.

Thereafter, the user will be prompted for case input of target production information in fluid barrels per day.

Once all of the setup preferences and all of the case inputs have been entered, records will be retrieved from a database containing technical attributes and capabilities for each piece of equipment.

The various records retrieved from the database are merged to create a number of individual files with a separate file created for each preferred pumping unit selected by manufacturer. A calculated score will be derived for each preferred pumping unit which represents an average weighted score of a number of a separate factors. Without limitation, these factors include a gearbox loading score, a structure loading score, a system efficiency score, a rod loading score, a minimum polished rod load score, and a bottom minimum stress score.

The present invention also includes a feedback loop procedure to provide options in order to attempt to improve the score with other equipment options.

The score derived for each configuration may be compared against other preferred pumping units by manufacturer. Additionally, the cost of the equipment and the cost to operate the equipment is also determined and may be compared.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIGS. 1 through 5 illustrate a sequential flowchart of the process of the present invention. The present invention may be utilized with a personal computer central processing unit (not shown) having a display, an input such as a keyboard, and a mouse.

Figure 1:
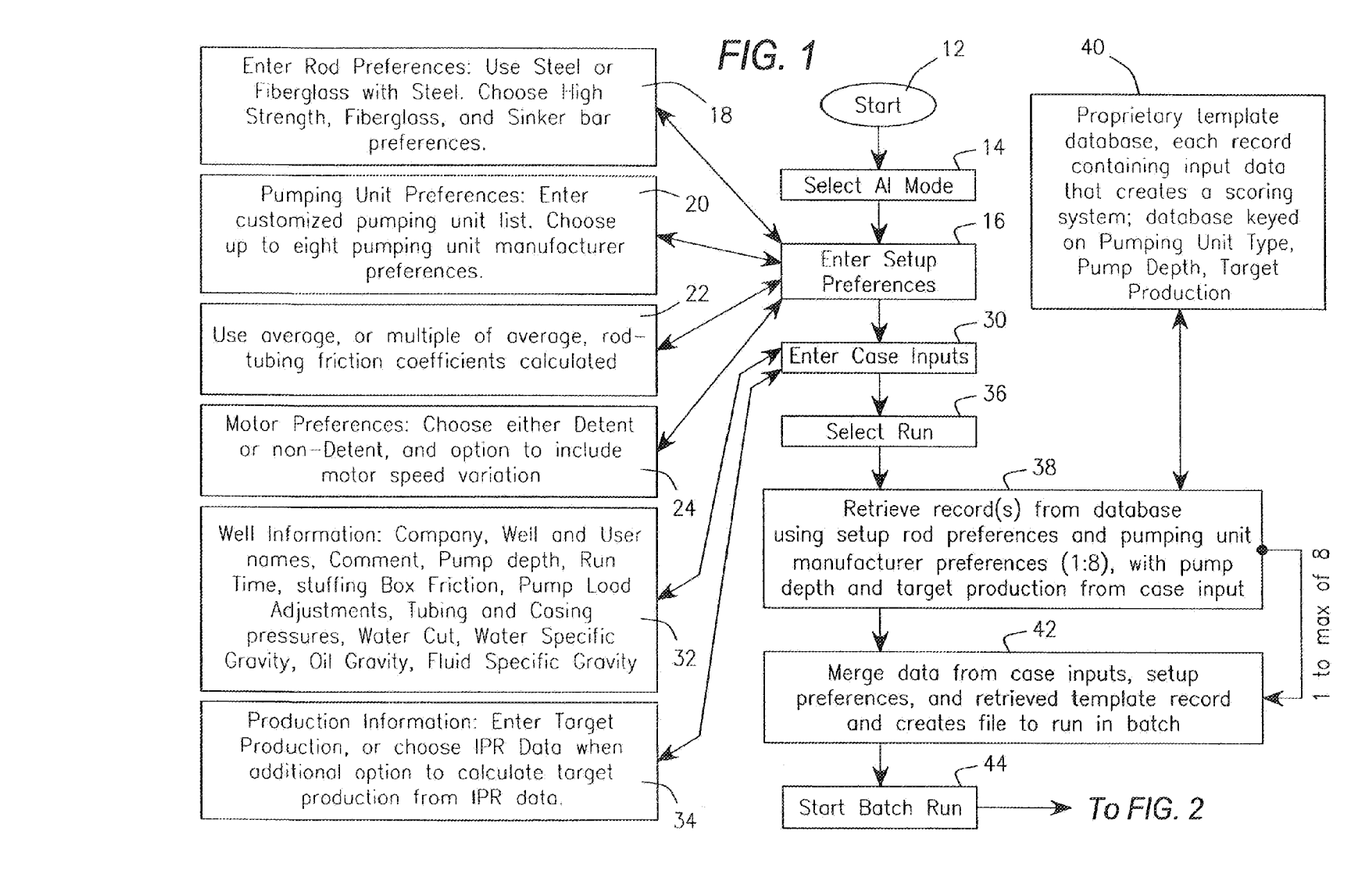
FIGS. 1 through 5 illustrate sequential flowcharts illustrating the system and the process to select, evaluate and recommend optimal rod pumping system design for downhole well in accordance with the present invention.

In particular, FIG. 1 illustrates the initial sequences of the process of the invention. Beginning at oval 12 illustrating the start of the invention, a user may select the automated, artificial intelligence or AI mode as shown at box 14 which takes advantage of all of the features of the invention to be described herein. In the event that the AI mode is not selected, the system may optionally operate by manually entering various parameters and information on chosen equipment.

Another initial setting (not shown) will be for English or metric units. For example, the depth of the pump in the well may be expressed in feet or meters. The user may also select "Canadian" units which provides the appropriate mix of English and Metric unit inputs used in Canadian oilfields.

Thereafter, the user will be prompted to enter a number of setup preferences as shown at box 16. The present embodiment includes four categories of setup preferences although other configurations are possible.

Figure 6:
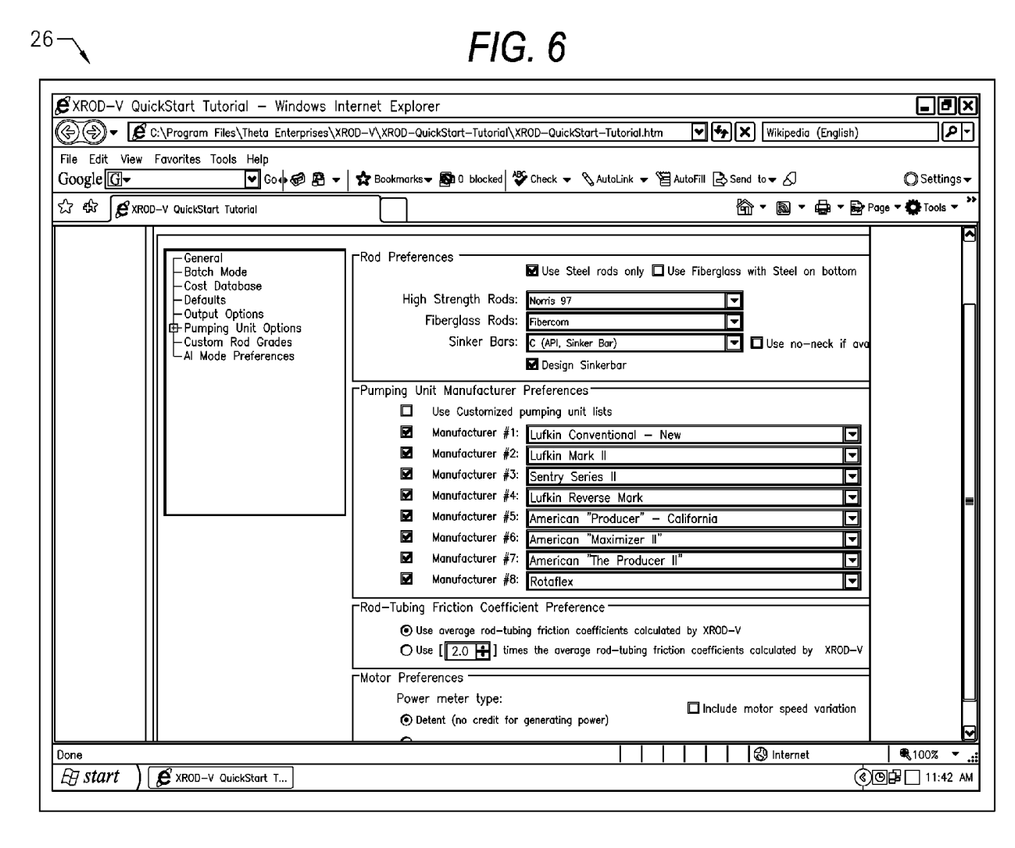
FIG. 6 illustrates a representation of a screen shot illustrating use of the present invention.

In one non-limiting example, as shown in the computer screen display in FIG. 6, the user will be presented with a display on a display screen 26 to enter rod preferences as depicted at box 18 in FIG. 1.

In connection with the rod preferences, the user will be presented with an option to select either all steel rods or, alternatively, a combination of fiberglass rods with a number of steel rods near the bottom of the well.

In some applications, ordinary rods are not adequate. Based on a number of parameters, the present invention will calculate if high strength rods are necessary. In the event that high strength rods are deemed necessary, the user will be given an option to select a type or brand of high strength rods by manufacturer. Additionally, the user will be given an option to select a preferred type or brand of fiberglass rod.

In some applications and installations, the use of sinker bars is desired. Sinker bars are typically larger diameter rods used to keep the rods above them in tension to prevent rod buckling. The user will also be prompted to enter a preferred type or brand of sinker bars, if necessary.

Thereafter, the user will be prompted and requested to enter one or more pumping unit equipment preferences by manufacturer. The user will be able to enter up to eight different pumping unit preferences as shown at box 20 in FIG. 1 and as seen in FIG. 6.

As will be explained in detail, the present invention includes a database which has stored therein various technical features on each manufacturer's pumping unit.

It is known that the reciprocating rods encounter friction as they operate downhole. As seen at box 22 in FIG. 1, a further setup preference is the use of average or multiple of average rod-tubing friction coefficients.

It is known that friction is caused downhole by viscous fluids, such as fuel, or by paraffin which is sometimes encountered downhole. The invention will calculate an average friction coefficient from all of the parameters entered therein.

With further reference to the screen display in FIG. 6, the user would also be presented with an option to use average rod-tubing friction coefficients or, alternatively, a multiple of average rod-tubing friction coefficients.

Finally, the user will be prompted to select electric motor preferences that include the power meter type (detent or non-detent), and whether or not to include the effect of motor speed variation as shown at box 24 and on FIG. 6. All of the foregoing are entered as setup preferences and all are stored in the system.

Thereafter, the user will be prompted to enter a number of case inputs as shown at box 30.

The user will be prompted to enter information on the well as shown at box 32 in a number of categories including the particular company that owns or operates the well, the particular well name, the particular user name and any additional comments.

The user will also be prompted to enter the pump depth which indicates the depth within the well where the pump will be located. Additionally, the user will be prompted to enter the run time which indicates the approximate number of hours per day that the equipment will be operating.

Optional entries in the well information include stuffing box friction, pump load adjustments, tubing and casing pressures, and the water cut percentage which indicates the estimated percentage of water in the production fluid to be extracted. For example, 50% of the fluid to be extracted may be water. Additional inputs may be water specific gravity, oil gravity, and fluid specific gravity. Each of these have default settings in the event no information has been entered.

Thereafter, as shown at box 34, target production information for the well will be entered as a case input. The user will be prompted to either enter target production in fluid barrels per day or, alternatively, will enter inflow performance data (IPR) in order to allow the invention to calculate estimated production per day.

Once all of the setup preferences have been entered and all the case inputs have been entered, the user will be prompted to begin running the invention calculations as shown at box 36. As shown at box 38, records will be retrieved from a database 40. For example, records are stored on the technical attributes and capabilities for each piece of equipment. The database may be stored in the database of personal computer central processing unit or may be stored in an external database.

Thereafter, the various records retrieved from the database are merged to create a number of discreet files as shown in box 42. The present invention uses the case inputs and overwrites each data item in the template record and creates a file to run in batch. This includes using the rod design from the template. The program uses the pumping unit from a template and determines the closest pump unit size for the given manufacturer preference. Thereafter, the invention will begin batch runs with each preferred pumping unit selected by manufacturer creating a separate batch file as shown at box 44.

Figure 2:
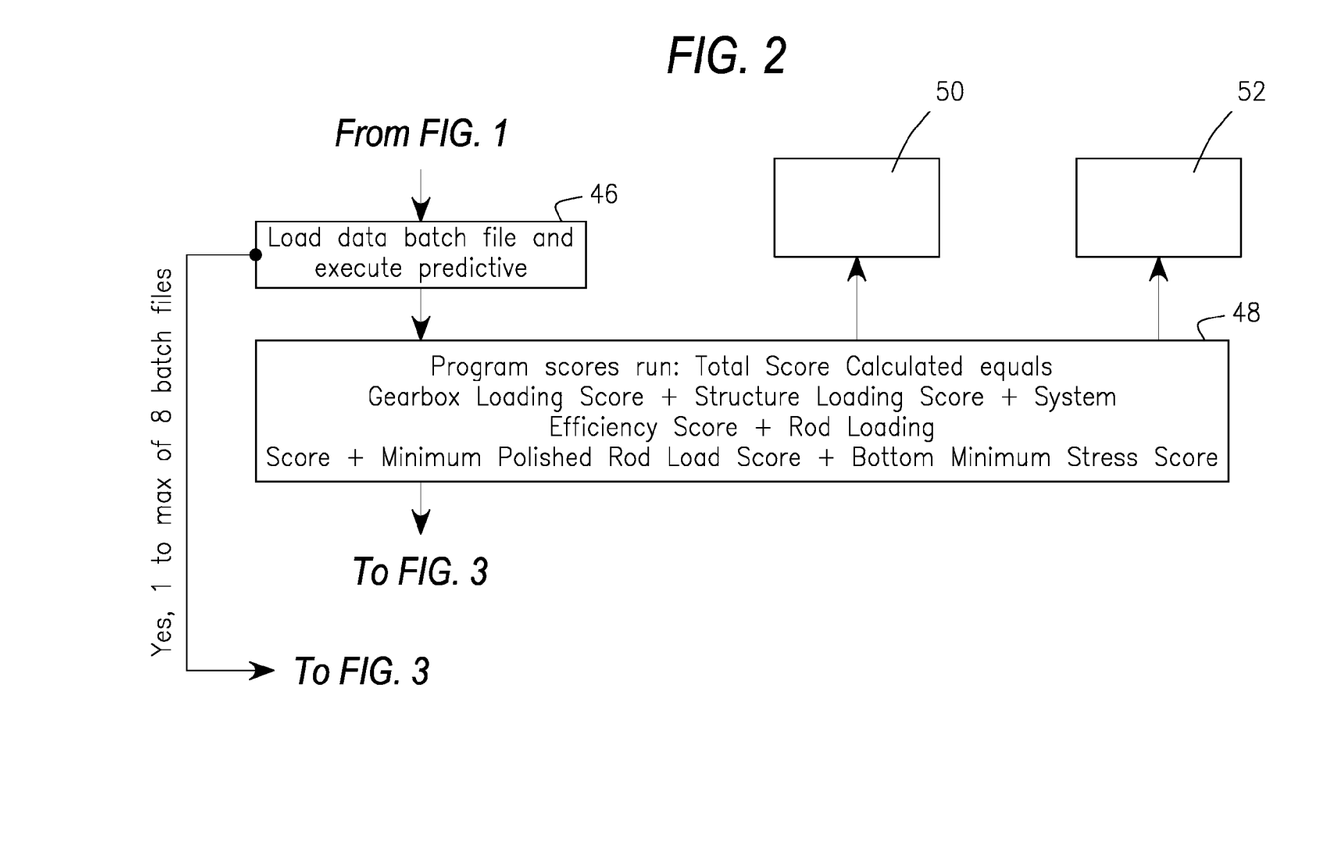

Continuing in the process as shown in the configuration of the flowchart on FIG. 2, the data batch files will be loaded in order to derive a calculation for each pumping unit as shown at box 46.

The system of the present invention will derive a calculated score for each batch representing a preferred pumping unit by manufacturer. For example, if four pumping unit preferences were selected, then four scores will be calculated. Each calculated score represents an average weighted score of a number of separate factors. Without limitation, these factors include a gear box loading score, a structure loading score, a system efficiency score, a rod loading score, a minimum polished rod load score, and a bottom minimum stress score as shown at box 48.

Gearbox loading indicates the percent loading of the gearbox of the pumping unit. Stated in other words, this indicates how much torque the gearbox will take. For example, if the actual maximum gearbox torque is 525,000 inch-pounds (inch-lbs), and the pumping unit gearbox is rated for a maximum torque of 456,000 inch-pounds, then the loading would equal 115.13%.

Structural loading refers to the total loading of the pumping unit structure represented in pounds. For example, the pumping unit will be rated for a maximum load in pounds. If the actual peak polished rod load for the selected equipment is half of that amount, then the structural loading would be 50%.

System efficiency is the overall efficiency of the entire pumping system from the motor to the pump and measures the efficiency of how the pumping system converts input energy into the motor to fluid production. The efficiency of the systems is typically in the order of from 35% to 60%. The higher the efficiency, the lower the cost of lifting produced fluids to the surface.

Rod loading is a designation that shows if the total assembly of rods in the rod string that connects the polished rod to the pump is overloaded and is expressed in a percentage.

Minimum polished rod load should be positive in order to make sure that the carrier bar does not separate from the polished rod on the down stroke which might cause equipment damage and premature failures.

The derivation of each particular score is shown in detail in boxes 50 and 52.

For example, with respect to the gear box loading score, a procedure is followed where if gear box loading for the smallest gear box size with the same stroke length from a selected preference pump manufacturer is less than 70%, then a score will be assigned equal to 100. In that case, the remainder of gear box scoring logic is avoided. Otherwise, the gear box loading percentage will result in assignment of a score in accordance with a table as shown in detail in box 50.

Thereafter, a structure loading score will be, determined. If loading for the smallest structure size preferred pumping unit with the same stroke length and gear box size is less than 70%, then a score of 100 will be assigned. In that case, the remainder of the structure loading score is avoided. Otherwise, the structure loading percentage will result in assignment of a score in accordance with a table as shown in box 50.

A similar procedure will be used for a system efficiency score, a rod loading score, a minimum polished rod load score, a bottom minimum stress score, and a fiberglass bottom minimum stress score as shown in detail in boxes 50 and 52.

The average scores of all of the multiple individual scores will then be determined for a combined calculated score as shown at box 48.

Figure 3:
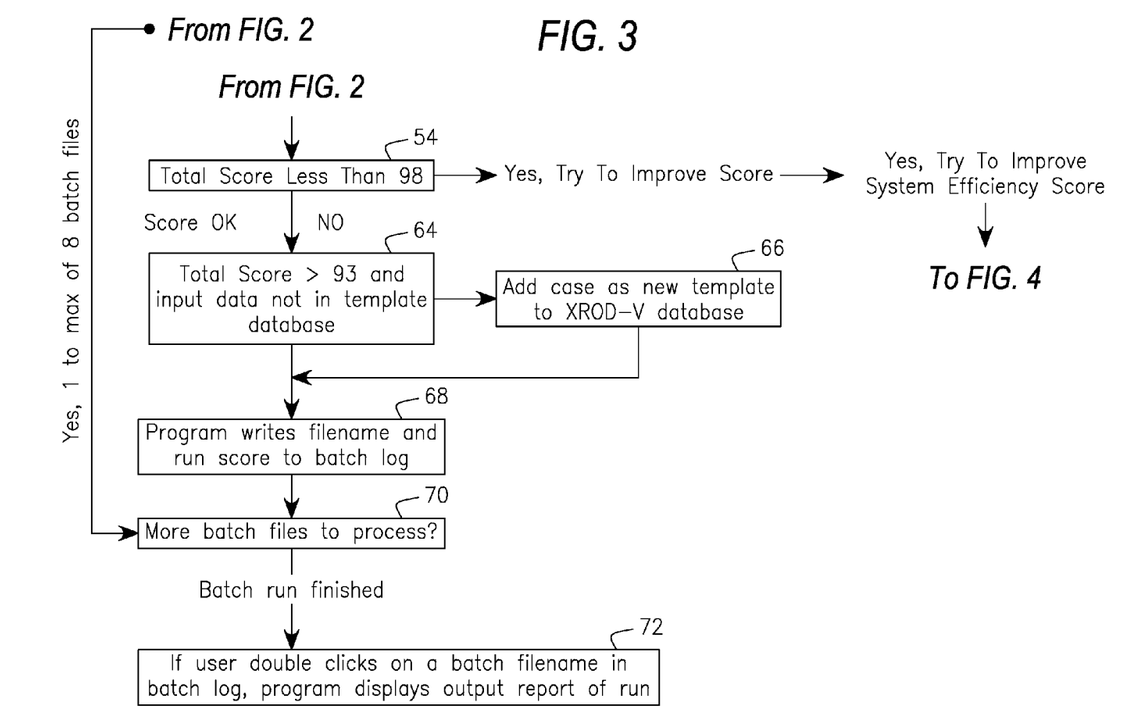

Continuing on in the process from FIG. 2 to a consideration of FIG. 3, a feedback loop procedure is employed which will provide options to attempt to improve the score with other equipment options. By way of example, if the total calculated score from the foregoing is less than 98 as shown at box 54, the system will try to improve the score. This is shown in detail in the process shown in FIG. 4. For example, in order to improve system efficiency score, the process will be run again with the next largest plunger size for the pumping equipment as shown at box 56. If the score is greater than the original score, the new plunger size will be retained, otherwise, the system will revert to the original plunger size.

Figure 4:
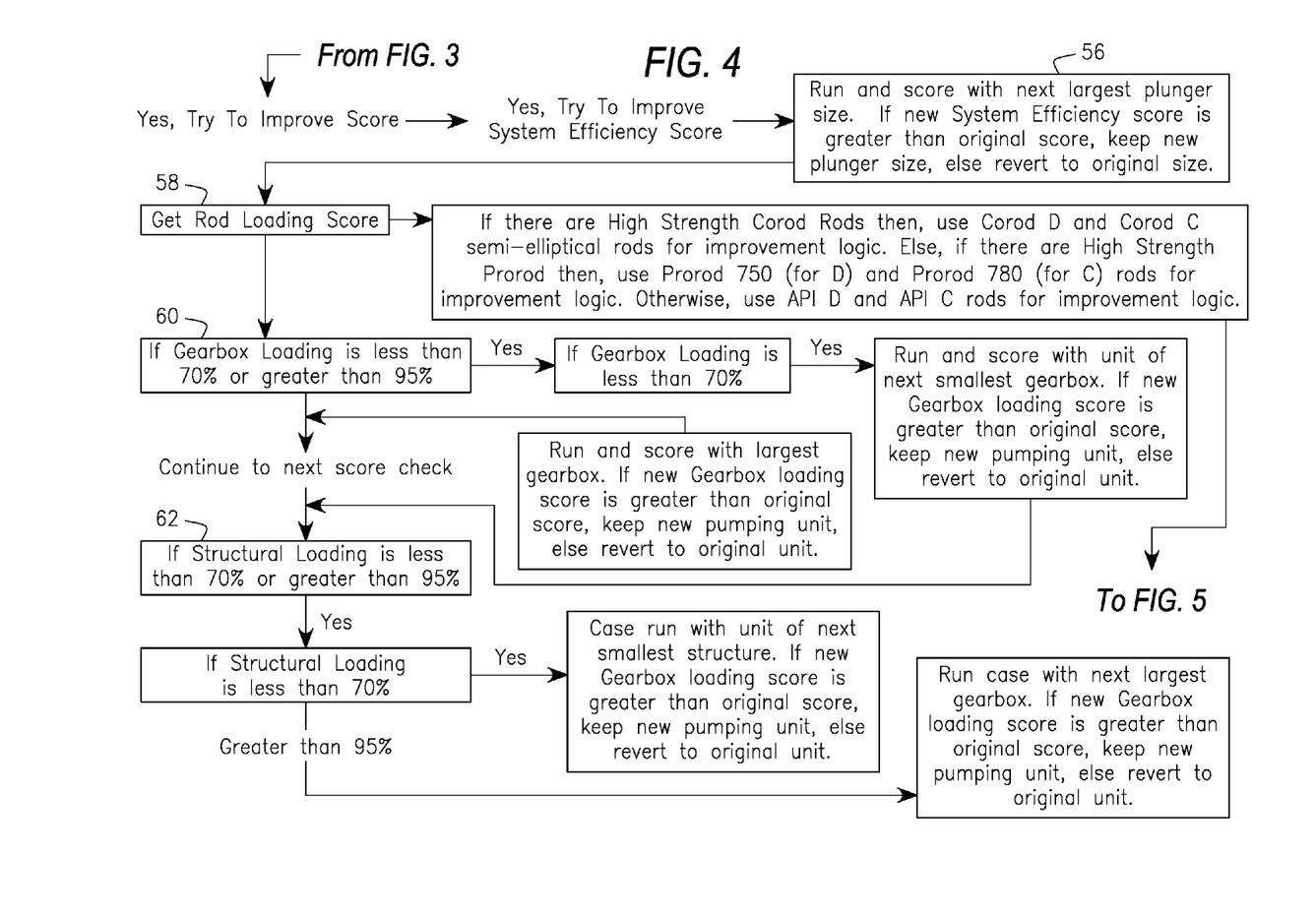

Similarly, the rod loading score, the gear box loading score and the structure loading score will each be considered for alternative configurations. As shown at box 58, the rod loading score is obtained and then considered for possible improvements. As continued on to FIG. 5, alternate rod designs will be considered.

Figure 5:
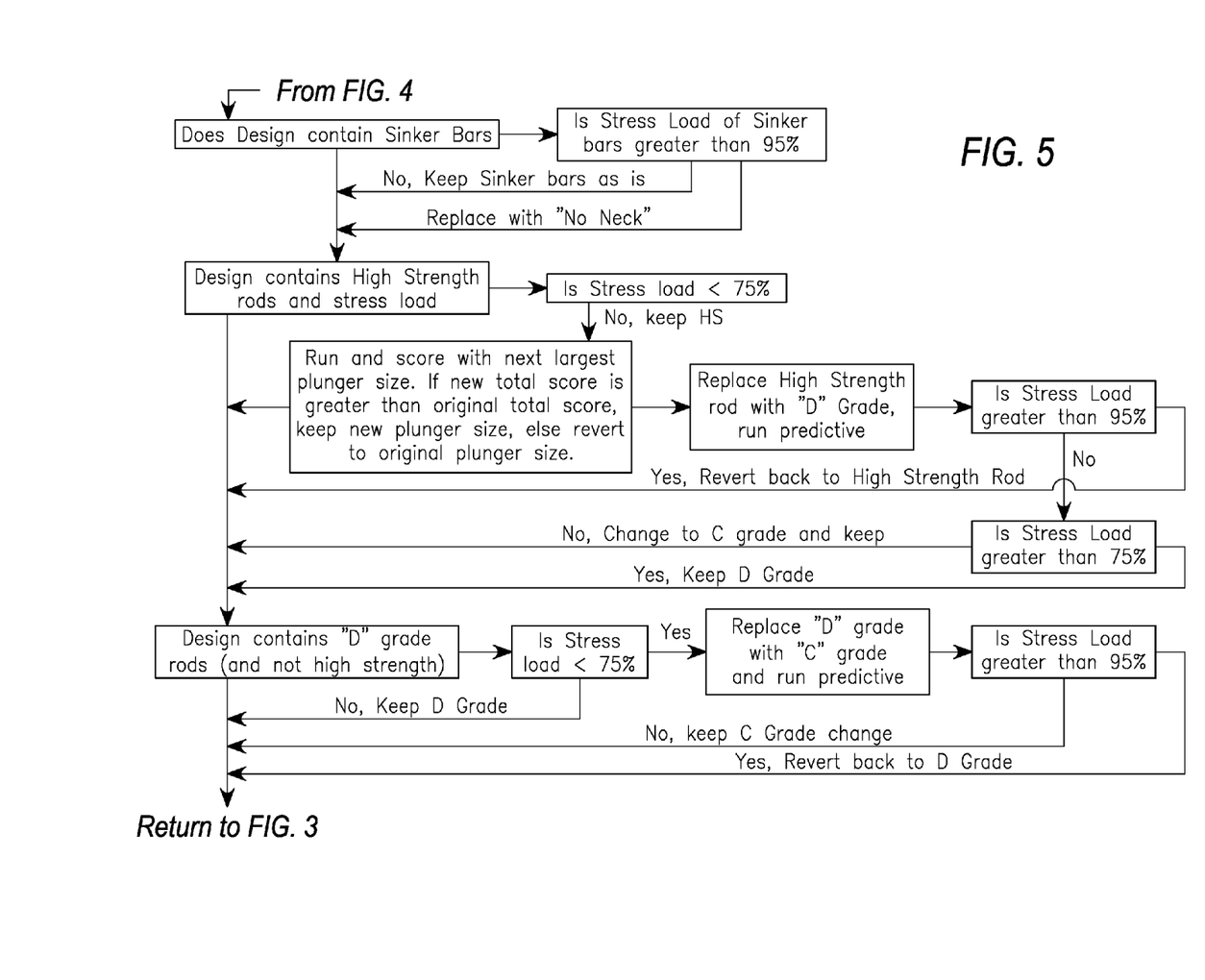

Thereafter, as shown at box 60, the gear box loading score is obtained and considered for possible improvement. Thereafter, as shown at box 62, the structure loading score is obtained and considered for possible improvement.

Returning to a consideration of FIG. 3, the present invention has the ability to store and thereby "learn" from various configurations. As shown at boxes 64, 66 and 68, if the total score is greater than 93 and the input data is not in the database as a template, a new case will be added to the database. The added new database record is then used when needed in future runs.

Similarly, calculations for each of the pumping units by manufacturer would be run as separate batch files as shown at box 70. Since each pumping unit configuration results in an overall calculated score, it is possible to easily compare the configurations.

The system also has the ability to generate a display of an output of all parameters on a particular pumping unit configuration as shown at box 72.

Finally, the cost of the equipment and the cost of electricity to operate the well for each configuration may be displayed.

Whereas, the present invention has been described in relation to the drawings attached hereto, it should be understood that other and further modifications, apart from those shown or suggested herein, may be made within the spirit and scope of this invention.

What is claimed is:

1. A method to select and evaluate optimal components for installation and operation of a rod pumping system for a downhole fluid well, which method comprises:

selecting at least one downhole rod type as a setup preference;

selecting at least one pumping unit type as a setup preference;

selecting a motor power meter type as a set up preference;

entering well information including depth of pump and run time as a case input;

entering a target production for said well as a case input;

retrieving records from a database wherein said records contain input data on each said downhole rod type, each said pumping unit type, and each said pump motor type;

merging data from all said case inputs, from all said setup preferences, and from said database records;

calculating individual scores of gear box loading, structure loading, system efficiency, rod loading, minimum rod load, and bottom minimum stress; and combining said individual scores to determine a calculated percentage score for each said pumping unit type for said rod pumping system.

2. A method as set forth in claim 1 including an additional step of selecting an average tubing friction coefficient or a multiple average rod-tubing coefficient.

3. A method as set forth in claim 1 wherein said at least one downhole rod type includes steel rods or fiberglass rods with steel rods on bottom.

4. A method as set forth in claim 1 wherein said step of selecting at least one pumping unit type includes up to eight different choices.

5. A method as set forth in claim 1 wherein said step of selecting at least one pumping unit type includes designating pumping units by manufacturer.

6. A method as set forth in claim 1 including the additional step of selecting at least one default setting chosen from the group consisting of a compressibility index, electricity costs, and standard sucker rod length.

7. A method as set forth in claim 1 wherein said at least one type of power meter for said motor includes detent motors and non-detent motors.

8. A method as set forth in claim 1 wherein said step of entering a target production for said well includes entering a production rate in barrels per day or entering IPR data for said well.

9. A method as set forth in claim 1 including the additional step of predicting electricity consumption for each said pumping unit type.

* * * * *